(12) United States Patent
Bürßner et al.

(10) Patent No.: US 11,585,446 B2
(45) Date of Patent: Feb. 21, 2023

(54) PROPORTIONAL VALVE

(71) Applicant: ETO MAGNETIC GMBH, Stockach (DE)

(72) Inventors: Jörg Bürßner, Engen (DE); Peter Vincon, Stockach (DE)

(73) Assignee: ETO MAGNETIC GMBH, Stockach (DE)

( * ) Notice: Subject to any disclaimer, the term of this patent is extended or adjusted under 35 U.S.C. 154(b) by 0 days.

(21) Appl. No.: 17/275,710

(22) PCT Filed: Aug. 29, 2019

(86) PCT No.: PCT/EP2019/073131
§ 371 (c)(1),
(2) Date: Mar. 12, 2021

(87) PCT Pub. No.: WO2020/052989
PCT Pub. Date: Mar. 19, 2020

(65) Prior Publication Data
US 2022/0034410 A1 Feb. 3, 2022

(30) Foreign Application Priority Data
Sep. 13, 2018 (DE) ...................... 10 2018 122 437.0

(51) Int. Cl.
*F16K 3/316* (2006.01)
*F16K 27/04* (2006.01)
(Continued)

(52) U.S. Cl.
CPC ............ *F16K 3/316* (2013.01); *F16K 27/048* (2013.01); *F16K 31/0668* (2013.01);
(Continued)

(58) Field of Classification Search
CPC ........ F16F 9/465; F16K 3/316; F16K 27/048; F16K 31/0668; F16K 31/1221; F16K 31/124; F16K 31/42
See application file for complete search history.

(56) References Cited

U.S. PATENT DOCUMENTS 3,032,312 A * 5/1962 Greenawalt ............. F25B 41/26
137/340
4,178,768 A 12/1979 Pauliukonis
(Continued)

FOREIGN PATENT DOCUMENTS

CN 102913634 A 2/2013
CN 105443837 A 3/2016
(Continued)

OTHER PUBLICATIONS

International search report for patent application No. PCT/EP2019/073131 dated Dec. 3, 2019.

*Primary Examiner* — Umashankar Venkatesan
(74) *Attorney, Agent, or Firm* — Bachman & LaPointe, P.C.

(57) ABSTRACT

An electromagnetic and pilot-operated proportional valve with a valve slide unit (12) mounted in a valve housing (10) so as to be movable along an axial direction, which unit can be driven by an electromagnetic actuator assembly (16) provided at one axial end for the pilot-operated opening of a useful fluid inlet and/or outlet (24) of the valve housing as a response to energisation of a stationary coil (20) of the actuator assembly and interacts with mechanical force storage means (48, 50), more particularly is held in an unenergised stable axial position in the valve housing by said means, wherein the valve slide unit having a closure section (22) extending radially from one body section (30) of the valve slide unit (12) for sealing interaction with the useful fluid inlet or outlet (24) formed on a circumferential inner (Continued)

wall of the housing (10) interacts axially at one end, by means of the preferably cylindrical and/or coaxially extending body section (22), with a stationary guide section (40) of the valve housing to form an axial sliding bearing (62) and, at the other end, is mounted with radial play (56), wherein preferably ring-shaped sealing means (32) seal a circumferential section of the body section with radial play to the circumferential inner wall of the valve housing.

18 Claims, 1 Drawing Sheet

(51) Int. Cl.
*F16K 31/06* (2006.01)
*F16K 31/122* (2006.01)
*F16K 31/124* (2006.01)
*F16K 31/42* (2006.01)
*F16F 9/46* (2006.01)

(52) U.S. Cl.
CPC ........ *F16K 31/124* (2013.01); *F16K 31/1221* (2013.01); *F16K 31/42* (2013.01); *F16F 9/465* (2013.01)

(56) References Cited

U.S. PATENT DOCUMENTS

| | | | | |
|---|---|---|---|---|
| 4,535,966 | A * | 8/1985 | Post | F15B 13/0435 |
| | | | | 251/63 |
| 6,152,178 | A | 11/2000 | Hirota et al. | |
| 9,140,375 | B2 * | 9/2015 | Feser | F16K 31/1221 |
| 2003/0102041 | A1 * | 6/2003 | Gray, Jr. | B60K 6/12 |
| | | | | 138/30 |
| 2011/0291034 | A1 * | 12/2011 | Bunge | F16K 3/265 |
| | | | | 251/12 |

FOREIGN PATENT DOCUMENTS

| | | |
|---|---|---|
| DE | 102010005524 A1 | 7/2011 |
| DE | 102012103300 A1 | 4/2013 |

* cited by examiner

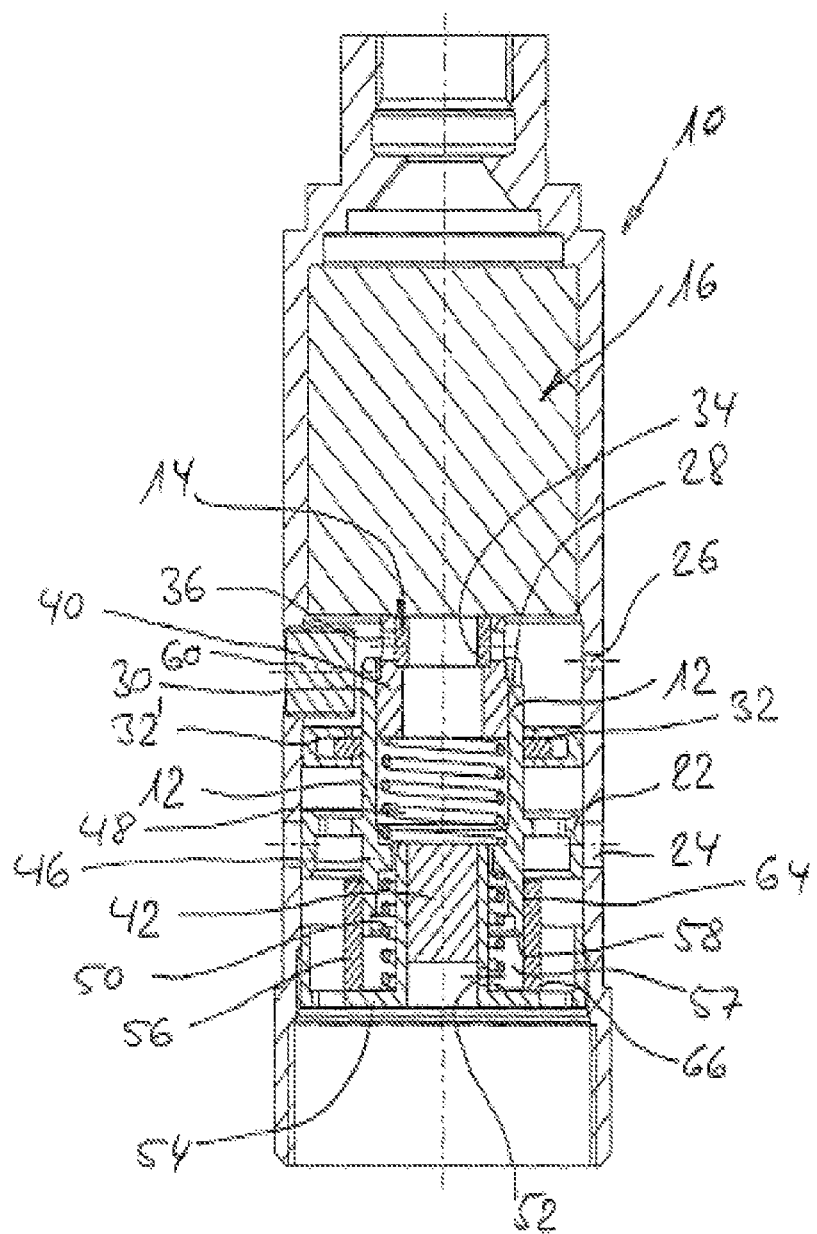

PROPORTIONAL VALVE

BACKGROUND OF THE INVENTION

The present invention relates to an electromagnetically and pilot-operated proportional valve.

Such a device is generally known in the form of conventional electromagnet valves, such as those developed and produced by the applicant, for example, and usually has a valve slide which is operated by an electromagnetic actuator assembly, the valve slide then opening or closing a fluid flow path to be (proportionally) controlled by the valve in the provided manner. In particular, it is known to dispose openings to be opened or to be closed in an accordingly controlled manner in a circumferential area of a valve housing (which is usually oblong in an axial direction), a valve slide guided on the inside of the valve housing then interacting with the openings and (partially or entirely) opening the inlet or outlet for the useful fluid according to its position (which is electromagnetically influenced by the actuator assembly).

In said generic and known technology, the valve slide is usually directly driven by the electromagnetic actuator assembly (more precisely: by armature means guided so as to be movable relative to stationary coil means and in response to an energization of said coil means), which act on the front side at one end of the valve slide unit.

However, such a direct control is often impractical or is not technically feasible, in particular in connection with high pressures in the useful fluid, the valve slide (valve slide unit) of such a way valve thus being operated by means of a so-called pilot control and therefore indirectly by the effect of the electromagnetic actuator assembly.

This technology is known as such and is used, in particular, for the pilot control of generic valves in the automotive or utility vehicle context, but is not limited to such a use. A pilot fluid is controlled by means of the electromagnetic actuator assembly, the pilot fluid then acting on the valve slide unit via a suitable pressure or engagement surface, the valve slide unit thus being able to open the inlet or outlet for the useful fluid in a controlled manner. In particular, the actuator assembly controls a differential pressure of the pilot fluid, wherein a restoring force of energy storage means acts against said differential pressure.

Such a pilot control technology, which usually acts on one axial end of the valve slide unit in the known state of the art, already requires design effort, in particular with respect to the bearing of the valve slide unit in the valve housing along the valve lift to be undergone by the valve slide unit; it is of particular importance to prevent a wedging or jamming which potentially impedes the functioning.

The bearing of the valve slide unit is made more complex by a conceivable embodiment of the valve slide unit driven (in a pilot-controlled manner) by the electromagnetic actuator technology if the valve slide unit is to be moved in both axial directions in a pilot-controlled manner—therefore in opposite directions depending on the control—usually starting from a (de-energized) stable axial central position in the valve housing.

Such a bearing of a valve slide unit by means of conventional means would lead to bearing redundancies because of the (sliding) bearing to be provided at both axial ends of the valve slide unit and at the radial circumference in relation to a surrounding valve housing, wherein said bearing redundancies either severely limit the options of a control or dimensioning of such a unit or even make it impossible to realize certain design options (such as a bidirectionally switchable pilot-control fluid guiding through the valve slide unit).

SUMMARY OF THE INVENTION

Therefore, the object of the present invention is to create an electromagnetically and pilot-operated proportional valve, the design of which is improved with respect to its bearing and guiding properties in the valve housing while not being affected in particular by functional problems and/or dimensioning limitations caused by bearing redundancies and which therefore establishes the conditions for a realization of a valve slide which can be operated in a pilot-controlled manner on both axial sides (both ends) and which can be optimized for the required pressure engagement surfaces in almost any way.

Said object is attained by the electromagnetically and pilot-operated proportional valve having the features disclosed herein; advantageous embodiments of the invention are also described herein and in dependent claims. Additional protection within the scope of the invention is sought for a use of such an electromagnetically and pilot-operated proportional valve for the fluid circuitry of a useful fluid in a vehicle and/or automotive context, an application for controlling the chassis and/or for setting a damping system for a vehicle being particularly preferred.

In an advantageous manner according to the invention, the valve slide unit according to the invention is first mounted in the valve housing in such an axially sliding manner that a sliding bearing is realized at one end in conjunction with a stationary guide section of the valve housing, a (preferably at least partially cylindrical) body section of the valve slide unit interacting with the stationary guide section in a sliding manner, more preferably surrounding said guide section in a sliding manner to realize the sliding bearing. The "stationary guide section" according to the claim does not necessarily mean a one-piece, integral component of the valve housing; within the scope of the invention, it is functionally sufficient if the stationary guide section according to the claim is fixed in its position, in particular in the axial direction (i.e., the movement direction of the valve slide unit in the housing) and guides the sliding relative movement of the body section of the valve slide unit. Nevertheless, the guide section can also be realized as a component or extension of a coil support for the coil means (cost-efficiently manufactured as an injection-molded part) in a constructively elegant manner.

The invention provides, however, that the valve slide unit is mounted with radial play in the housing at the opposite axial end of the body section, which corresponds to an opposite axial end section of the valve slide unit.

This measure to avoid bearing redundancies of the bearing of the valve slide unit in the valve housing according to the invention is additionally supported by the supplemental feature according to the invention according to which the valve slide unit is supported by means of the ring-shaped sealing means on the radial side in relation to the (surrounding) valve housing, said ring-shaped sealing means, which are usually realized in several parts and in order to form a radially acting variable gap or play, realizing a fluid sealing to the circumferential inner wall of the valve housing.

In this way, the present invention advantageously eliminates a bearing redundancy by realizing the intended and required sliding bearing functionality by means of the respective bearing assemblies (bearing of the body section on the end side (front side) on the one hand, ring-shaped sealing means on the other hand) provided with play on the one hand, but minimizing the risk of wedging, jamming or a similar malfunction by means of the provided radial play on the other hand, in particular if pilot pressure is applied to the valve slide unit from both sides (again in relation to the axial direction).

In an embodiment according to the invention, the ring-shaped sealing means realized in multiple parts sit in a sealing manner on the valve slide unit (more precisely: the preferably cylindrical body section of the valve slide unit) in such a manner that they extend parallel to the closure section realized as a ring flange. Advantageously, a circumferential sealing area of the closure section engages onto the useful fluid inlet or outlet, which means that the axial movement of the valve slide unit can affect the controlled exposure of said opening, preferably in both directions.

According to another advantageous embodiment, the ring-shaped sealing means limit a space in the valve housing via which pilot fluid from outside the valve housing can enter the valve housing and can apply pilot fluid pressure to an effective pressure surface in the form of a first front surface at one end of the valve slide unit (on the body section) in a corresponding manner.

Within the scope of the invention, the bearing with play of the other end of the body section (i.e., the end axially opposite to the bearing by the stationary guide section) is particularly advantageously realized with a bearing bush into which the end of the body section extends. Once said bearing bush sits on an axial end surface, e.g. a front surface of the valve housing, a pressure application via the bearing bush—in particular, as additionally provided according to an embodiment, via a pilot fluid inlet from the end or front surface—can cause an additional pressure application on said bearing assembly. At the same time, a pressure engagement surface for the pilot fluid is formed in the bush, for example in the form of a front surface at the end of the (again preferably cylindrical) section of the valve slide unit. However, the bearing, which is preferably realized by the described bearing bush according to the embodiment, has play in relation to the stationary guide section because the bearing bush sits thereon—a radial fixation is not realized at said bearing position of the valve slide unit.

According to an embodiment particularly advantageous and elegant in terms of design, the valve slide unit is preloaded in a predefined closure position as a relative position of the closure section in relation to the useful fluid inlet or outlet by spring means, for example in such a manner that such a (rest) position of this kind is set between a pair of pressure springs suitably engaging onto the valve slide unit. This position corresponds to the de-energized stable position of the valve slide unit.

Constructively, it is particularly advantageous for the design of said variant of the invention to provide at least one of these pressure spring/s in a (preferably hollow-cylindrical) inner area of the body section of the valve slide unit and to provide an inner ring shoulder of the body section as an abutment, for example.

Within the scope of the discussed embodiment of a bearing of the body section which has a bearing bush at the bottom, such a bearing bush would also be able to support such a pressure spring, for example, which means that this de-energized stable position could be defined, more preferably by means of second pressure springs engaging onto opposite sides of the ring section. In this case, the second pressure spring would have to be suitably supported by a stationary housing section.

An advantageous embodiment of the invention provides that an electromagnetically driven armature of the electromagnetic actuator assembly according to the invention is disposed—separately as a module or connected in one piece—in the area of the stationary guide section of the valve housing, in particular and more preferably that the armature is guided by the (suitably hollow-cylindrical) guide section.

In this way, a flow chamber for pilot fluid can be realized between the guide section (or the body section of the valve slide unit guided therein in the form of the sliding bearing) and the armature; additionally, a preferred embodiment of the invention provides that the armature realized like a slide or as an armature slide is used to control an inlet and/or outlet cross section for pilot fluid. To this end, an armature relative position can open this inlet and/or outlet cross section for the pilot fluid in the intended manner, in particular in the manner of a displaceable orifice between the armature (armature slide) on the one side and the guide section of the valve housing on the other side.

Said functionality is expanded in a particularly elegant manner by the fact that, according to the preferred realization of the invention as a bidirectionally pilot-controlled proportional valve, i.e., the possibility of introducing a pilot fluid pressure in the axial end area of the guide section of the valve slide unit on the one side and of the opposite end (mounted with play) on the other side, pilot fluid can be applied to the valve slide unit, for example by means of suitable external switching of the pilot fluids supplied in each case. The described (electromagnetically controllable) opening realized in the manner of an orifice between the guide section and the armature slide according to the embodiment would then allow fluid to flow in both directions, enabled by the advantageous feature of the valve slide unit (more precisely: of the preferably hollow-cylindrical body section of this valve slide unit) according to the embodiment of being permeable for pilot fluid flow in both axial directions.

In the described way, the present invention thus realizes a highly reliable proportional valve device which is simple to realize with respect to the design and mechanics, which can be used for almost any purpose and which can be pilot-controlled in a bidirectional manner and which also allows various dimensioning and design options, in particular with respect to pilot pressure surfaces at the valve slide unit, without disadvantageous wedging or blocking effects (caused by redundancies) during the operation. The present invention is thus also suitable in particular for (high pressure) fluid control applications in an automotive or vehicle context; however, this does not limit the application range of the technology according to the invention.

BRIEF DESCRIPTION OF THE DRAWINGS

Further advantages, features and details of the invention are apparent from the following description of preferred exemplary embodiments and from the drawings; in the drawings, FIG. 1 shows a longitudinal sectional view of the electromagnetically and pilot-operated proportional valve in the de-energized state of the electromagnetic actuator assembly according to a first exemplary embodiment of the invention.

DETAILED DESCRIPTION

A valve slide unit 12 is mounted in a valve housing 10 of the proportional valve so as to be movable in an axial direction; the axial direction corresponds to the vertical direction in the drawing layer of FIG. 1 and in this respect to an actuator movement direction of a (radially symmetrical) armature slide unit (armature slide) 14 of an electromagnetically operated actuator assembly 16 which is provided in the upper end at the end in valve housing 10. In a manner known per se, armature slide unit 14 is axially moved against a restoring force of spring means of actuator assembly 16 in response to an energization of stationary coil means (upwards in the drawing layer and towards stationary core means of actuator assembly 16 not shown in detail in the case at hand).

Electromagnetic actuator assembly 16 is used for the realization of an electromagnetically operated pilot valve by means of which valve slide unit 12 is piloted in order to drive it. More precisely, a pilot fluid entering a first pilot fluid inlet 26 (formed at the circumference in valve housing 10) is applied to a first front surface 28 at the end of a body section 30 at the end of valve slide unit 12 in order to realize a first pilot fluid path in valve housing 16 and to drive the valve slide unit in a downward direction (a closure section 22 radially projecting in one piece from valve slide unit 12 opening a useful fluid inlet or outlet 24 in a circumferential area of valve housing 10 for the damper fluid, which corresponds to the main circuit, in a controlled manner), the (pilot-) controlled downward movement thus being realizable.

In this process, the pilot pressure in a pressure chamber limited by a seal 32 (with radial play) is defined or influenced by a pilot fluid flow cross section formed by means of a pair of orifices 36, the cross-sectional width of the pilot fluid flow cross section being influenced by a current armature slide position of electromagnetic actuator assembly 16. More precisely, said passage cross section for the pilot fluid is defined by a sliding overlapping of two cylindrical sections—a section 34 (internal section 34 in the cross-sectional view of FIG. 1) of armature slide 14 on the one side and a radially external stationary guide section 40 on the other side; guide section 40 supports bore (orifice) 36 which extends in the radial direction and which is configured to interact with section 34 in a sliding manner. In the shown exemplary embodiment, the pair of orifices 36 is geometrically aligned in such a manner that a flow is blocked in the shown de-energized stable position (which corresponds to a fail-safe-position for actuator assembly 16, namely if a power outage or similar fault states occur), or, alternatively, that a predefined minimum pilot fluid flow can flow through a flow cross section which is greater than zero.

The first downward pilot fluid flow path defined by first control fluid inlet 26 at one end and subsequently by the pair of orifices 36 extends centrally through the inside of valve slide unit 12 and leads to first outlet valve means realized as check valve 42 at the bottom of the assembly shown in FIG. 1.

Accordingly, the embodiment of the proportional valve shown in FIG. 1 allows controlled driving of valve slide unit 12 in a downward direction by means of pilot fluid introduced into the first pilot valve inlet, the valve slide unit being displaced from its center position defined by a pair of pressure springs 48, 50 engaging onto both sides of a central ring section 46 by the action of the incoming pilot fluid and opening inlet or outlet 24 for the purpose of actuating a compression stage of the damper unit, for example.

Additionally, the proportional valve device in the exemplary embodiment of FIG. 1 realizes a second pilot fluid flow path which, axially opposite to the flow direction of the first path and in order to apply a drive movement (upwards in the drawing layer in FIG. 1) to valve slide unit 12, allows a rebound stage to be realized in the described damping system, once more by piloting the same electromagnetic actuator assembly 16.

To this end, a second pilot fluid inlet 52 is realized in a lower or bottom area of valve housing 10. A bearing bush 56 sits (with radial play) on a housing section 54 on the front side. This bearing bush limits a pressure chamber 57 of second pilot fluid inlet 52 in the radial direction, allowing entering pilot fluid to engage onto and apply pressure to a second front surface 58 at the end of valve slide unit 12 (therefore axially opposite to first front surface 28 at the other end) and thereby effect a displacement (upwards in the drawing layer of FIG. 1) of valve slide unit 12 in order to open inlet or outlet 24. The second pilot fluid flow path limited by the second pilot fluid inlet extends through the hollow interior of valve slide unit 12 to orifice area 36 which, by means of its cross section width which is controlled by actuator assembly 16, opens the fluid flow to second outlet valve means 60 again realized as a check valve (provided at the circumference of valve housing 10 in the case at hand).

When the stationary coil means (not shown in detail) are energized, armature slide 14 moves axially upwards against the restoring force of spring means, after which in particular the overlapping between orifices 36 changes, in particular continuously opens the flow cross section when the actuator assembly is energized, up to a maximum opening.

Furthermore, the longitudinal sectional view of FIG. 1 shows how the interaction in particular of stationary guide section 40, of armature slide 14 (having armature slide section 38 at the end) and valve slide unit 12 having multiple bearings in terms of design and geometry can be established in a simple manner and can be operated in a low-wear and therefore reliable manner; additionally, an elegant bearing technology removes and avoids possible mechanical redundancies in a low-wear manner: As can be seen, stationary guide section 40 does not only guide armature slide unit 14 (on the radial inside) in the housing in the shown exemplary embodiment. Guide section 40 also realizes a sliding bearing for body section 30 of valve slide unit 12 surrounding guide section 40.

On the axially opposite side, valve slide unit 12 is mounted with (radial) play-reference signs 64 and 66 illustrate said bearing freedom achieved by means of described bearing bush 56, namely by the fact that bearing bush 56 enclosing valve slide unit 12 in a sliding manner (merely) sits on front housing area 54 and is not radially fixed there.

Additionally, a radial support or bearing with play of valve slide unit 12 is realized by ring unit 32' in relation to the (hollow-cylindrical) inner wall of valve housing 10: Said multi-piece bearing ring realizes the sealing (required for the realization of the pilot fluid flow chamber) and ring elements which are radially displaceable relative to one another ensure that a radial friction-type connection between the valve slide unit and the valve housing is eliminated, thus again avoiding mechanical redundancies.

The present invention is not limited to the described context of a (double-stage) damper pressure control; in fact, the invention is suitable for any application in which flexible pilot and configuration properties can be used in an advantageous manner.

The invention claimed is:

1. An electromagnetically and pilot-operated proportional valve having a valve slide unit (12) mounted in a valve housing (10) so as to be movable along an axial direction, the valve slide unit (12) being drivable by an electromagnetic actuator assembly (16) provided at one axial end for the pilot-operated opening of a usage fluid inlet and/or outlet (24) of the valve housing in response to an energization of stationary coil means of the actuator assembly and interacting with mechanical force storage means (48, 50), wherein the valve slide unit (12) has a closure section (22) which extends in the radial direction from a body section (30) of the valve slide unit (12) for sealing interaction with the usage fluid inlet or outlet (24) realized on a circumferential inner wall of the housing (10), and wherein the valve slide unit (12) interacts with a stationary guide section (40) of the valve housing at an axial end by means of the body section (30) in order to realize an axial sliding bearing and is mounted with an axial bearing with radial play (56) at the other end of the body section (30), wherein sealing means (32) seal a circumferential section of the body section (30) with radial play to the circumferential inner wall of the valve housing (10); and wherein the axial bearing with radial play has a bearing bush (56) overlapping the other end of the body section, wherein the bearing bush (56) is mounted with radial play in relation to the stationary guide section (40).

2. The valve according to claim 1, wherein the sealing means (32) realized in multiple parts are axially spaced apart.

3. The valve according to claim 2, wherein the sealing means (32) realized in multiple parts extends parallel to the closure section which is a ring-flange-like closure section (22).

4. The valve according to claim 1, wherein a pilot fluid can be introduced into a space in the valve housing limited by the radial sealing means (32), in such a manner that pilot fluid pressure can be applied to a first front surface (28) at one end of the valve slide unit.

5. The valve according to claim 4, wherein the pilot fluid can be introduced into the space in the valve housing through a first pilot inlet (26) provided in the circumferential housing wall.

6. The valve according to claim 1, wherein the bearing bush (56) sits directly or indirectly on an inner front section (54) of the valve housing.

7. The valve according to claim 6, wherein the bearing bush (56) sits directly or indirectly on a front wall section of the valve housing.

8. The valve according to claim 1, wherein the bearing bush provides a second pilot fluid inlet (52) in such a manner that pilot fluid pressure can be applied to a second front surface (58) at the end of the valve slide assembly (12)

and/or wherein the bearing bush (56) forms and/or limits, a pressure chamber (57) open towards the second pilot fluid inlet (52).

9. The valve according to claim 8, wherein the bearing bush (56) radially limits the pressure chamber (57).

10. The valve according to claim 1, wherein the valve slide unit (12) is preloaded and/or held in relation to the usage fluid inlet or outlet (24), by the mechanical force storage means which comprise spring means (48, 50) engaging onto both axial ends and/or onto the inside of the valve slide unit (12).

11. The valve according to claim 10, wherein the valve slide unit (12) is preloaded and/or held in a closure central position of the closure section (22).

12. The valve according to claim 10, wherein the spring means (48, 50) is in the form of at least one pressure spring.

13. The valve according to claim 1, wherein the actuator assembly (16) is axially provided in the area of the stationary guide section (40) in the valve housing.

14. The valve according to claim 13, further comprising an armature slide (14) moved by energization of the coil means and guided through and/or in the stationary guide section.

15. The valve according to claim 1, wherein the valve slide unit (12) is held in an de-energized stable axial position in the valve housing by said force storage means (48, 50).

16. The valve according to claim 1, wherein the body section (30) comprises a cylindrical and/or coaxially with respect to the guide section (40) extending body section (30) of the slide valve unit (12).

17. The valve according to claim 1, wherein the sealing means (32) comprises a ring-shaped sealing means (32).

18. The valve according to claim 1, wherein the bearing bush (56) overlaps the end in the radial direction and/or on the outside.

* * * * *